US007315649B2

(12) United States Patent
Kisuki

(10) Patent No.: US 7,315,649 B2
(45) Date of Patent: Jan. 1, 2008

(54) INFORMATION RECOGNITION DEVICE OPERATING WITH LOW POWER CONSUMPTION

(75) Inventor: Yasuhisa Kisuki, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 764 days.

(21) Appl. No.: 10/658,320

(22) Filed: Sep. 10, 2003

(65) Prior Publication Data

US 2004/0141647 A1 Jul. 22, 2004

(30) Foreign Application Priority Data

Jan. 16, 2003 (JP) .............................. 2003-008624

(51) Int. Cl.
*G06K 9/00* (2006.01)
(52) U.S. Cl. ...................... 382/187; 345/169; 345/171; 345/179; 358/473; 382/186; 382/313
(58) Field of Classification Search ................ 345/169, 345/179, 171; 382/186, 187, 313, 314; 358/473
See application file for complete search history.

(56) References Cited

U.S. PATENT DOCUMENTS

| | | | | |
|---|---|---|---|---|
| 5,630,168 A | * | 5/1997 | Rosebrugh et al. | 710/5 |
| 5,644,653 A | * | 7/1997 | Sunakawa et al. | 382/187 |
| 6,212,297 B1 | * | 4/2001 | Sklarew | 382/189 |
| 6,718,060 B1 | * | 4/2004 | Yokota et al. | 382/187 |
| 6,831,632 B2 | * | 12/2004 | Vardi | 345/179 |
| 2002/0010006 A1 | * | 1/2002 | Wang | 455/566 |
| 2004/0012558 A1 | * | 1/2004 | Kisuki et al. | 345/156 |
| 2004/0141647 A1 | * | 7/2004 | Kisuki | 382/187 |
| 2006/0127872 A1 | * | 6/2006 | Marggraff | 434/353 |

FOREIGN PATENT DOCUMENTS

| JP | 7-244494 | 9/1995 |
|---|---|---|
| JP | 9-212192 | 8/1997 |

* cited by examiner

*Primary Examiner*—Gregory M Desire
(74) *Attorney, Agent, or Firm*—McDermott Will & Emery LLP

(57) ABSTRACT

A character recognition device recognizing characters with low power consumption includes a data input unit for entering handwriting data representing a character to be recognized, a character recognition dictionary storing character recognition information required for character recognition as well as operating frequency information concerning the operating frequency of the character recognition device that is set in connection with the recognition processing, a character recognition processing unit recognizing the character based on the handwriting data and the character recognition information, a recognition result output unit which outputs the character recognized by the character recognition processing unit, and a power management unit changing the operating frequency of the character recognition processing unit based on the operating frequency information stored in the character recognition dictionary.

6 Claims, 18 Drawing Sheets

F I G. 7
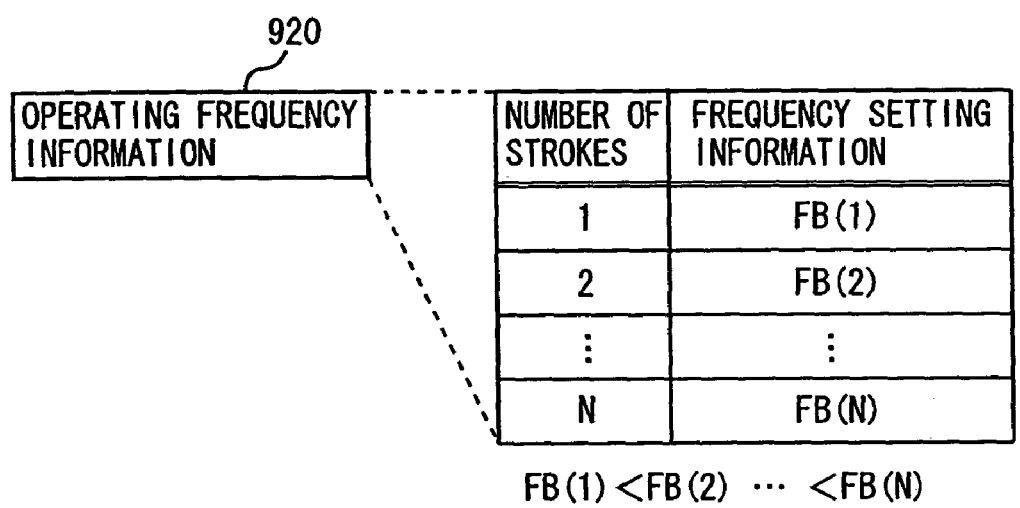

INFORMATION RECOGNITION DEVICE OPERATING WITH LOW POWER CONSUMPTION

BACKGROUND OF THE INVENTION

1. Field of the Invention

The present invention relates to a device which recognizes such information as characters and voice and, in particular, to an information recognition device which is controlled based on characters and voice to be recognized and accordingly achieves an effective reduction of power consumption.

2. Description of the Background Art

For battery-driven mobile information terminals that have recently been increasing in number, the battery time is considered as an important factor and thus reduction of the power consumption of the devices is an essential challenge in development. Then, there arises a severer requirement for reduction of the power consumption of a character recognition device and a voice recognition device that are incorporated into the mobile information terminals. Japanese Patent Laying-Open No. 7-244494 discloses a voice recognition device capable of recognizing voice in operating with low power consumption. This voice recognition device includes: a pre-processing circuit receiving an input voice to transmit feature pattern data containing a feature amount in a voice section of the input voice signal; similarity comparison and determination circuit connected to the pre-processing circuit to compare, in terms of similarity, the feature pattern data with reference pattern data for a plurality of voices that is stored in advance to determine the degree of similarity therebetween, based on a clock signal; and a control circuit having its input connected to the pre-processing circuit and the similarity comparison and determination circuit and having its output connected to the similarity comparison and determination circuit to decrease the frequency of the clock signal lower than a reference frequency if the resultant determination as to the similarity does not indicate a predetermined voice candidate or no voice is input in at least a certain time period.

The above voice recognition device can reduce the power consumption by decreasing the frequency of the clock signal lower than a reference frequency thereby decreasing the operating speed of the similarity comparison and determination circuit when, for example, no voice is input in at least a certain time period. Even if the similarity comparison and determination circuit operates with the reduced power consumption, it can still recognize voice since the clock signal is provided to the circuit.

The disclosed voice recognition device decreases the frequency of the clock signal lower than a reference frequency when a predetermined voice candidate cannot be obtained or no voice is input in at least a certain time period. For the battery-driven mobile information terminal, more delicate power control is necessary in order to extend the battery time. As the mobile information terminal has increased functions, the operating frequency of a microcomputer provided in the mobile information terminal becomes higher, which tends to result in increase in power consumption. Therefore, the control as disclosed in the above patent document cannot achieve delicate power control in operation and is thus unsatisfactory as a measure to decrease the power consumption.

SUMMARY OF THE INVENTION

One object of the present invention is to provide an information recognition device capable of recognizing characters with low power consumption.

Another object of the present invention is to provide an information recognition device capable of recognizing characters with low power consumption based on handwriting of a user.

Still another object of the present invention is to provide an information recognition device capable of recognizing voice with low power consumption.

A further object of the present invention is to provide an information recognition device capable of recognizing voice with low power consumption based on voice of a user.

A further object of the present invention is to provide an information recognition device readily capable of changing the language of characters to be recognized.

An information recognition device according to one aspect of the present invention includes an input unit for entering handwriting data representing a character to be subjected to recognition processing, a storage unit storing first information required for recognition of the character by a character recognition module and second information concerning power consumption of the information recognition device that is set in connection with the recognition processing, the character recognition module recognizing the character based on the handwriting data and the first information, an output unit outputting the character recognized by the character recognition module, a power management unit managing power consumption of the information recognition device, and a control module controlling the power management unit based on the second information.

An information recognition device according to another aspect of the present invention includes an input unit for entering voice data representing voice to be subjected to recognition processing, a storage unit storing first information required for voice recognition by a voice recognition module and second information concerning power consumption of the information recognition device that is set according to voice to be recognized, the voice recognition module recognizing voice based on the voice data entered from the input unit and the first information stored in the storage unit, an output unit outputting the voice recognized by the voice recognition module, a power management unit managing power consumption of the information recognition device, and a control module controlling the power management unit based on the second information stored in the storage unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows operating frequency information shown in FIG. 6.

DESCRIPTION OF THE PREFERRED EMBODIMENTS

Figure 1:
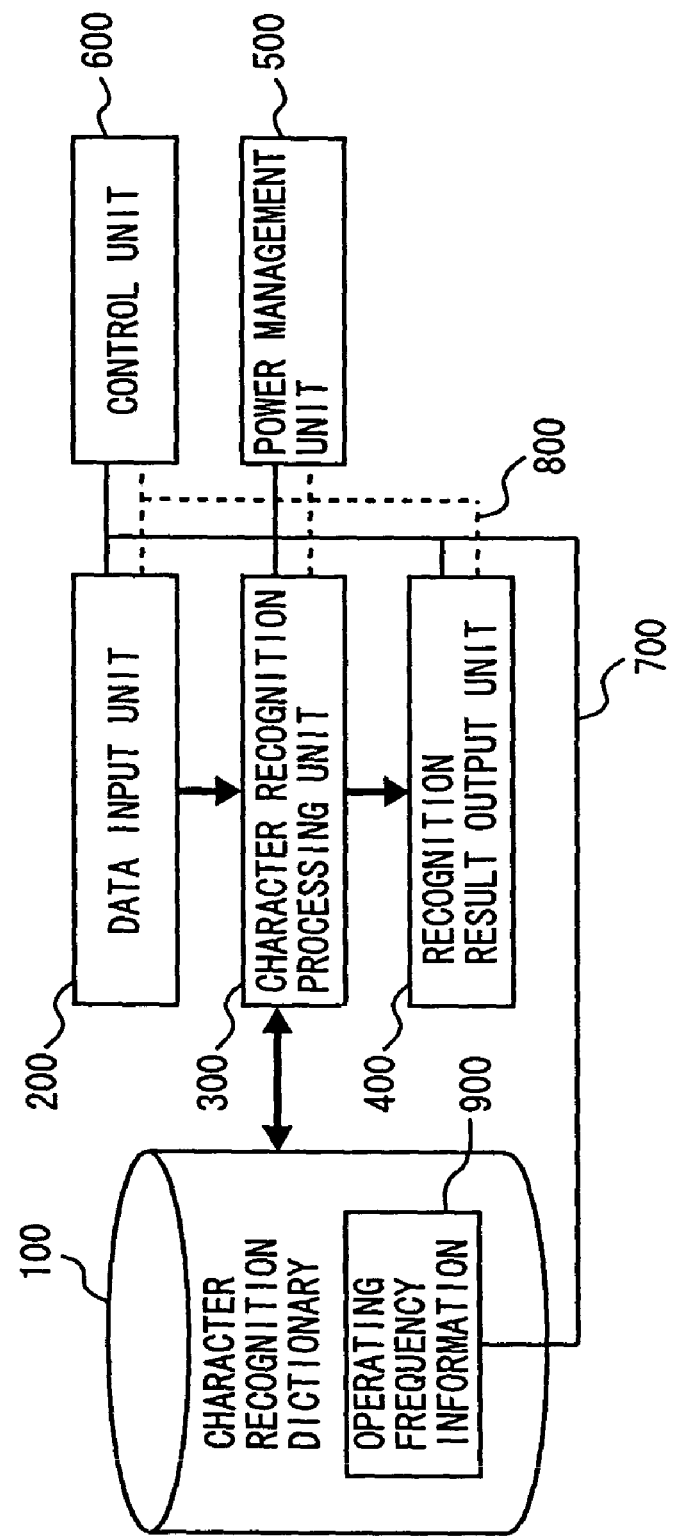
FIG. 1 is a control block diagram of a character recognition device according to a first embodiment of the present invention.

Embodiments of the present invention are now described with reference to the drawings. In the following description, the same components are denoted by the same reference character and identified by the same name and have the same function, and therefore detailed description thereof is not repeated here.

First Embodiment

A character recognition device according to this embodiment is hereinafter described.

Referring to FIG. 1, the character recognition device includes a character recognition dictionary 100 for use in a character recognition process, a data input unit 200 which is a touch panel for example for allowing a user to enter a character which the user desires to be recognized, a character recognition processing unit 300 performing character recognition processing by referring to character recognition dictionary 100 based on handwriting data supplied from data input unit 200, a recognition result output unit 400 which is a display for example to output the result of character recognition by character recognition processing unit 300, a control unit 600 controlling, via a control line 700, character recognition dictionary 100, data input unit 200, character recognition processing unit 300, and recognition result output unit 400, and a power management unit 500 controlling, via a control line 800, the operating frequency and the operating mode of data input unit 200, character recognition processing unit 300 and recognition result output unit 400.

Character recognition dictionary 100 is configured to be adapted for one language, as Japanese version, Chinese version, Korean version, English version or the like, and stored in a memory card for example. The memory card in which character recognition dictionary 100 is stored is detachably held in a card slot of the character recognition device. Character recognition dictionary 100 can thus be replaced to allow the character recognition device to be adaptable for multiple languages. Character recognition dictionary 100 stores operating frequency information 900. The stored operating frequency information 900 includes an average clock number necessary for the recognition processing as well as an average processing time for each operating frequency when a character is recognized by means of character recognition dictionary 100.

Control unit 600 calculates, by using operating frequency information 900, an optimum operating frequency of data input unit 200, character recognition processing unit 300 and recognition result output unit 400 of the character recognition device to output an instruction to power management unit 500 to set the calculated operating frequency. The optimum operating frequency here refers to a minimum operating frequency which is required for keeping an average time for character recognition processing within a predefined time. The character-recognition processing time depends on the number of characters to be recognized that are registered in character recognition dictionary 100. Therefore, as the operating frequency information, a smaller clock number is stored for a character recognition dictionary containing a smaller number of characters to be recognized.

Data input unit 200 is formed of a touch panel for example by which a user can enter handwriting with a finger or a pen. Further, data input unit 200 can process the entered handwriting as a coordinate data string.

Character recognition processing unit 300 performs character recognition processing for the coordinate data string input from data input unit 200 by referring to character recognition dictionary 100.

Figure 2:
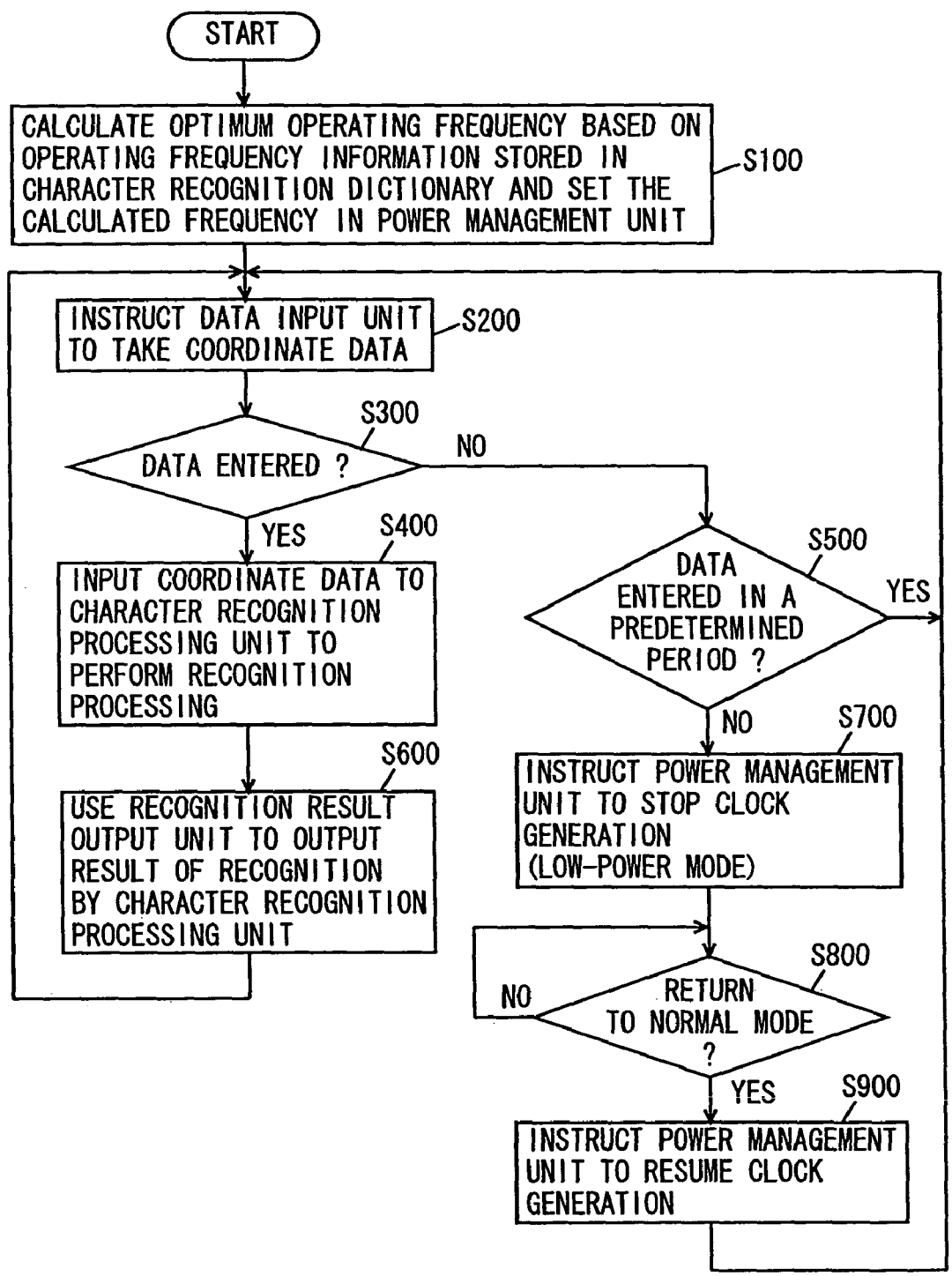
FIG. 2 is a flowchart showing a control structure of a program executed by a control unit in FIG. 1.

Referring to FIG. 2, a control structure of a program executed by control unit 600 in FIG. 1 is described.

In step (hereinafter abbreviated to S) 100, control unit 600 calculates an optimum operating frequency based on operating frequency information 900 stored in character recognition dictionary 100 and sets the calculated frequency in power management unit 500.

In S200, control unit 600 instructs data input unit 200 to take coordinate data. In S300, control unit 600 determines whether data is entered or not. If data is entered (YES in S300), the process proceeds to S400. If not (NO in S300), the process proceeds to S500.

In S400, control unit 600 inputs the coordinate data to character recognition processing unit 300 to perform recognition processing.

In S500, control unit 600 determines whether or not data is entered into data input unit 200 in a predetermined period. If data is not entered in the predetermined period (NO in S500), the process proceeds to S700. If data is entered in the predetermined period (YES in S500), the process returns to S200.

In S600, control unit 600 uses recognition result output unit 400 to output the result of recognition by character recognition processing unit 300. After this, the process returns to S200 to carry out character recognition processing for subsequent handwriting data entered into data input unit 200.

In S700, control unit 600 instructs power management unit 500 to stop clock generation, namely to shift the operating mode to a low-power mode. In S800, control unit 600 determines whether or not the character recognition device should be returned to a normal mode. In this case, it is determined that the mode should be returned to the normal mode when, for example, handwriting data is entered into data input unit 200 or a user pushes a specific button. For return to the normal mode (YES in S800), the process proceeds to S900. If not (NO in S800), the process returns to S800 to wait for the timing of returning to the normal mode.

In S900, control unit 600 instructs power management unit 500 to resume clock generation. The process thereafter returns to S200.

An operation of the character recognition device in this embodiment based on the above-discussed structure and flowchart is described below.

Character recognition dictionary 100 is inserted into the memory card slot of the character recognition device which is then powered, control unit 600 calculates an optimum operating frequency based on the operating frequency information stored in character recognition dictionary 100, and the calculated operating frequency is set in power management unit 500 (S100). At this time, the operating frequency is set in power management unit 500 according to the operating frequency which is set correspondingly to the number of characters to be recognized stored in character recognition dictionary 100 for each language. Power management unit 500 then sets the operating frequency of such components as data input unit 200, character recognition processing unit 300 and recognition result output unit 400.

When a user enters handwriting data from data input unit 200 such as touch panel or tablet (S200), coordinate data is input to character recognition processing unit 300 which then performs recognition processing (S400). The result of recognition by character recognition processing unit 300 is output from recognition result output unit 400 (S400).

In the above-described operation, if handwriting data is not entered from data input unit 200 in a predetermined period (NO in S500), control unit 600 instructs power management unit 500 to stop clock generation and shift the operating mode of the character recognition device to a low-power mode (S700). When a user pushes a specific button or enters handwriting data from data input unit 200, it is determined that the device should be returned to a normal mode (YES in S800) and control unit 600 instructs power management unit 500 to resume clock generation (S900).

As discussed above, the character recognition dictionary of the character recognition device in this embodiment stores the operating frequency information corresponding to the number of characters to be recognized. If the character recognition dictionary contains a small number of characters to be recognized, the control unit sets a lower operating frequency in the power management unit. A lower operating frequency results in a smaller power consumption, therefore, the power consumption can be reduced by changing the operating frequency based on the operating frequency information stored in the character recognition dictionary.

Second Embodiment

A character recognition device according to a second embodiment of the present invention is hereinafter described.

Figure 3:
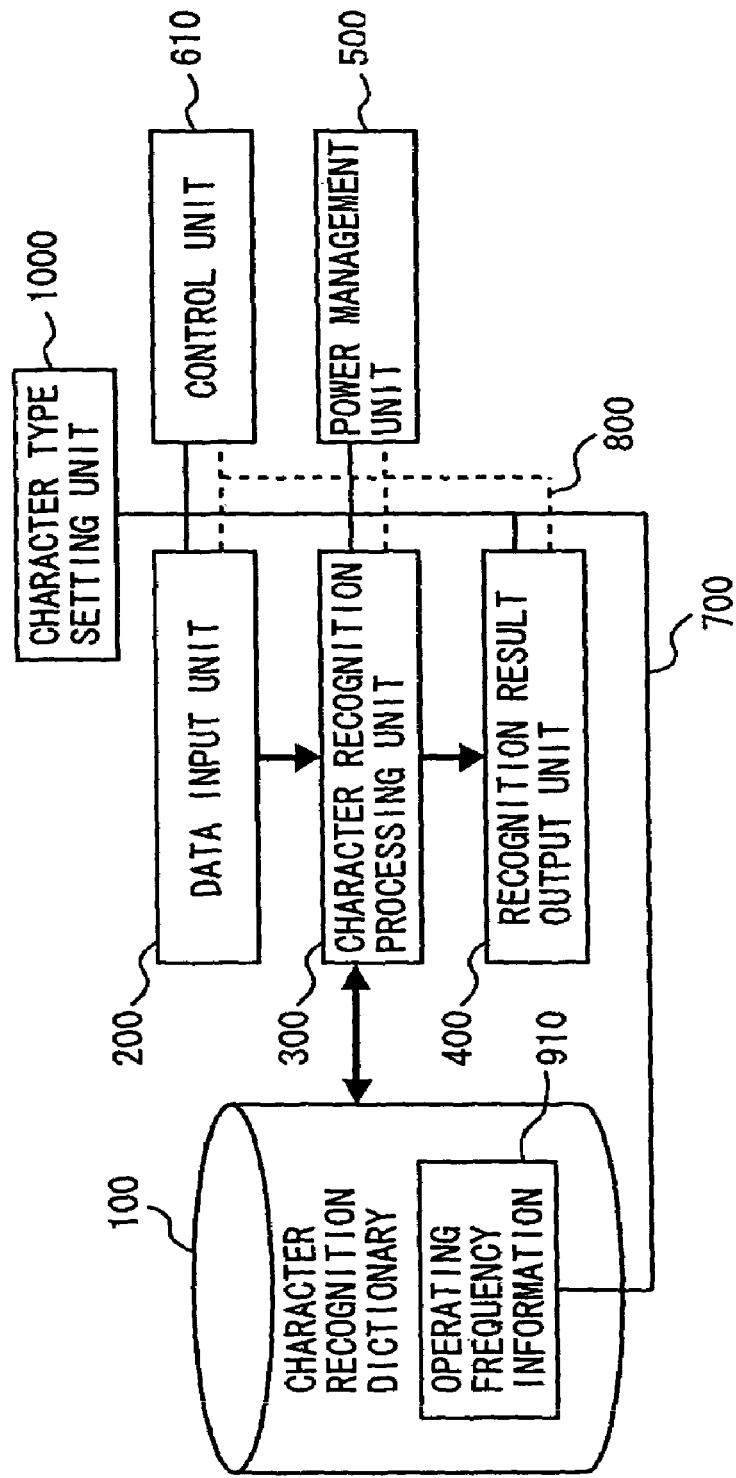
FIG. 3 is a control block diagram of a character recognition device according to a second embodiment of the present invention.

Referring to FIG. 3, a control block diagram of the character recognition device in this embodiment is described. It is noted that any component in the control block diagram shown in FIG. 3 that is the same as the corresponding one in FIG. 1 is denoted by the same reference character, has the same function, and thus detailed description thereof is not repeated here.

Referring to FIG. 3, the character recognition device in this embodiment includes a control unit 610 executing a program different from that of control unit 600 of the character recognition device in the above-discussed first embodiment, and operating frequency information 910 different from operating frequency information 900 and further includes a character type setting unit 1000 for setting the type of characters to be recognized that is not included in the character recognition device in the first embodiment.

Figure 4:
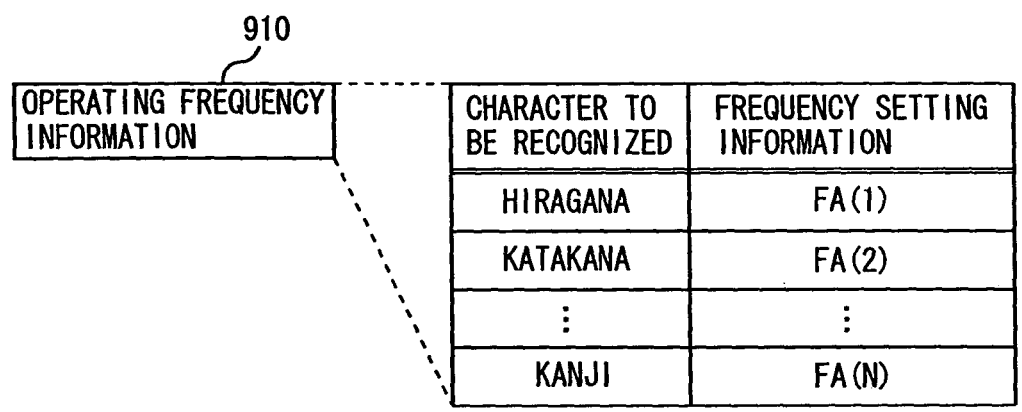
FIG. 4 shows operating frequency information shown in FIG. 3.

Control unit 610 executes a program different from that of control unit 600 of the character recognition device in the first embodiment discussed above. Further, as shown in FIG. 4, operating frequency information 910 stored in character recognition dictionary 100 includes frequency setting information for each type of characters to be recognized. For example, the frequency setting information is stored in such a way that, if the type of characters to be recognized is limited to Hiragana, the frequency setting information is "FA (1)" and, if the type of characters to be recognized is limited to Katakana, the frequency setting information is "FA (2)".

Character type setting unit 1000 is an input unit for allowing a user to set the type of characters to be recognized by this character recognition device. For example, the type of characters to be recognized is set by limiting it to Hiragana, Katakana or Kanji as shown in FIG. 4, or to English characters only, alphanumerics only or numerals only, for example.

Figure 5:
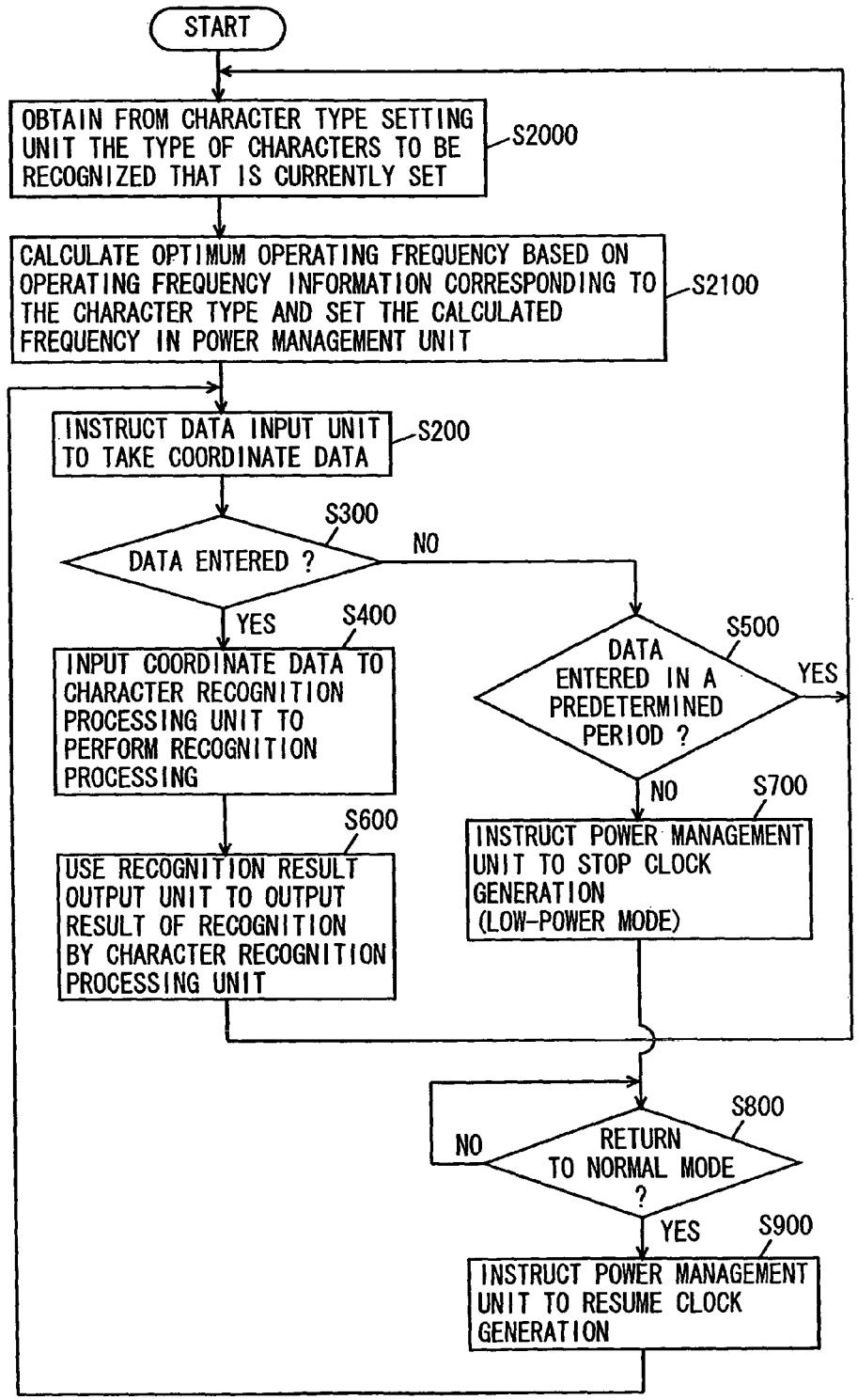
FIG. 5 is a flowchart showing a control structure of a program executed by a control unit in FIG. 3.

Referring to FIG. 5, a control structure of a program executed by control unit 610 of the character recognition device in this embodiment is described. It is noted that any process step in the flowchart shown in FIG. 5 that is the same as the corresponding one in FIG. 2 is indicated by the same step number, the processing therein is the same, and thus detailed description thereof is not repeated here.

In S2000, control unit 610 obtains, from character type setting unit 1000, the type of characters to be recognized that is currently set.

In S2100, control unit 610 calculates an optimum operating frequency based on the operating frequency information corresponding to the type of characters to be recognized, and sets the calculated frequency in power management unit 500.

An operation of the character recognition device in this embodiment based on the above-discussed structure and flowchart is described below.

When a user uses character type setting unit 1000 to limit the type of characters to be recognized to Katakana only, operating frequency "FA (2)" is selected that is the frequency setting information corresponding to Katakana as the type of characters to be recognized shown in FIG. 4, and the selected frequency is set in power management unit 500 (S2100).

At the operating frequency which is set as described above, data input unit 200, character recognition processing unit 300 and recognition result output unit 400 operate. Based on handwriting data entered into data input unit 200, character recognition processing unit 300 performs character recognition. The result of recognition by character recognition processing unit 300 is then output from recognition result output unit 400.

As discussed above, the character recognition device in this embodiment includes, in the character recognition dictionary, the operating frequency information for each type of characters to be recognized. The control unit can set an optimum operating frequency appropriate for the type of characters before the character recognition processing is carried out. Consequently, processing at unnecessarily high speed can be avoided and the power consumption can be reduced by making the operating frequency as low as possible.

Third Embodiment

A character recognition device according to a third embodiment of the present invention is hereinafter described.

Figure 6:
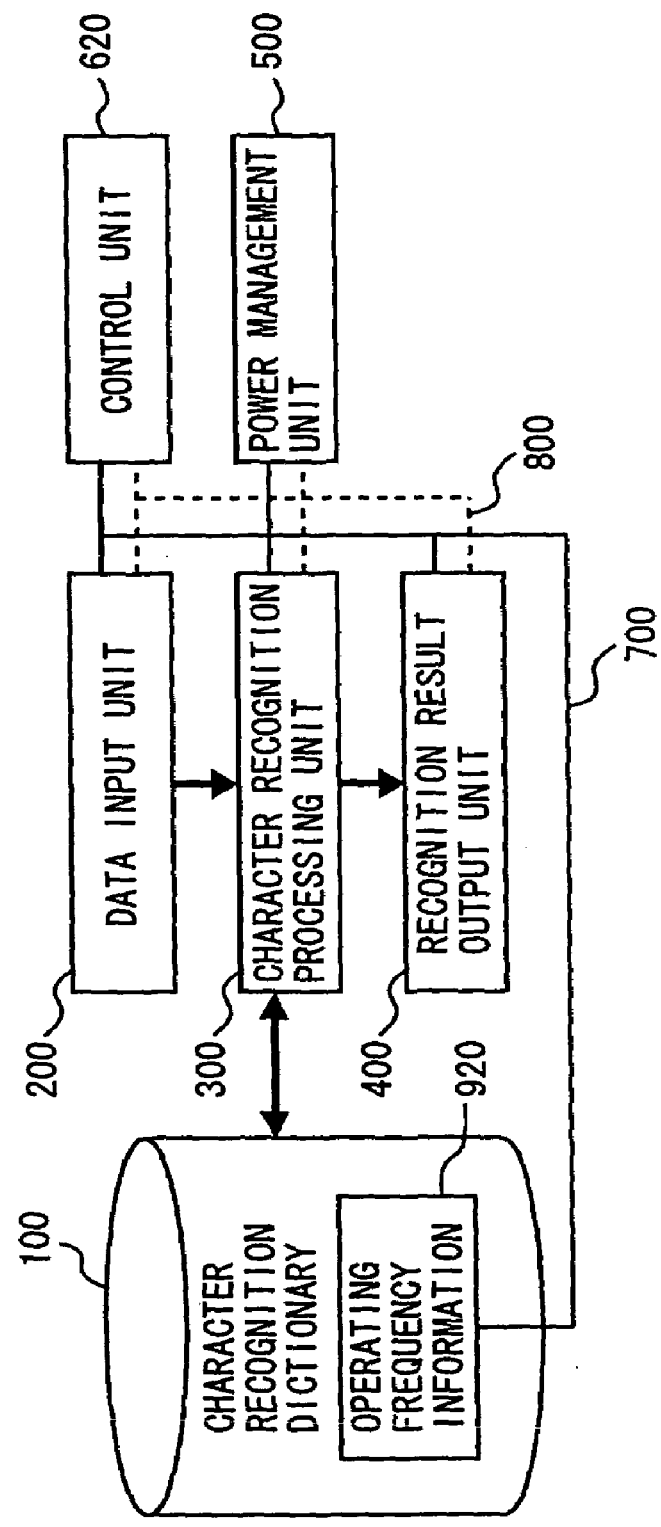
FIG. 6 is a control block diagram of a character recognition device according to a third embodiment of the present invention.

Referring to FIG. 6, a control block diagrams of the character recognition device in this embodiment is described. It is noted that any component in the control block diagram shown in FIG. 6 that is the same as the corresponding one in FIG. 1 is denoted by the same reference character, has the same function, and thus detailed description thereof is not repeated here.

Referring to FIG. 6, the character recognition device in this embodiment includes a control unit 620 executing a program different from that of control unit 600 of the character recognition device in the above-discussed first embodiment, and a character recognition dictionary 100 storing operating frequency information 920 different from operating frequency information 900 in the first embodiment.

As shown in FIG. 7, the stored operating frequency information 920 includes frequency setting information stored for each number of strokes of handwriting data entered in data input unit 200. For example, the frequency setting information is stored in such a way that the operating frequency is "FB (N)" when the number of strokes of a character is "N". Here, a lower operating frequency is set for a smaller number of strokes as shown in FIG. 7.

Figure 8:
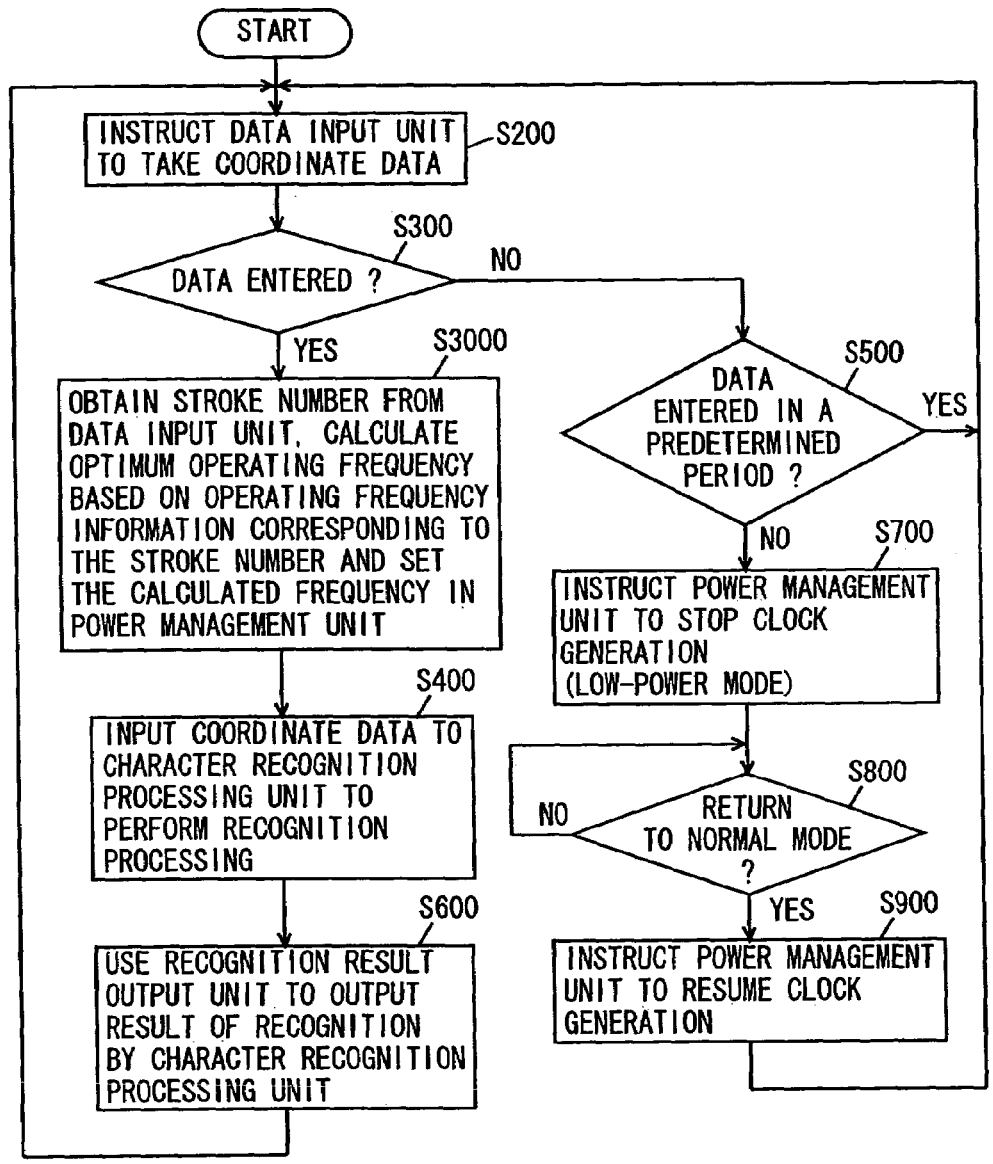
FIG. 8 is a flowchart showing a control structure of a program executed by a control unit in FIG. 6.

Referring to FIG. 8, a control structure of a program executed by control unit 620 of the character recognition device in this embodiment is described. It is noted that any process step in the flowchart shown in FIG. 8 that is the same as the corresponding one in FIG. 2 is indicated by the same step number, the processing in the step is the same, and thus detailed description thereof is not repeated here.

In S3000, control unit 620 obtains the number of strokes from data input unit 200 to calculate an optimum operating frequency based on the operating frequency information corresponding to the number of strokes, and sets the calculated frequency in power management unit 500.

An operation of the character recognition device in this embodiment based on the above-discussed structure and flowchart is described below.

When data is entered into data input unit 200 (YES in S300), control unit 620 obtains the number of strokes from handwriting information entered into data input unit 200 and calculates an optimum operating frequency based on the operating frequency information corresponding to the number of strokes. The calculated optimum operating frequency is set in power management unit 500. In this way, based on the number of strokes of handwriting data entered into data input unit 200, the operating frequency is set at which data input unit 200, character recognition processing unit 300 and recognition result output unit 400 operate.

Coordinate data entered to data input unit 200 is input to character recognition processing unit 300 which then performs character recognition processing (S400), and the result of recognition is output from recognition result output unit 400 (S600).

As discussed above, the character recognition device in this embodiment has, in the character recognition dictionary, the operating frequency information for each number of strokes. The control unit can thus set an optimum operating frequency appropriate for the number of strokes of the entered handwriting data before execution of the character recognition processing. Accordingly, processing at an unnecessarily high speed can be avoided. Moreover, as the operating frequency is set as low as possible, the power consumption can be reduced.

Fourth Embodiment

A character recognition device according to a fourth embodiment of the present invention is hereinafter described.

Figure 9:
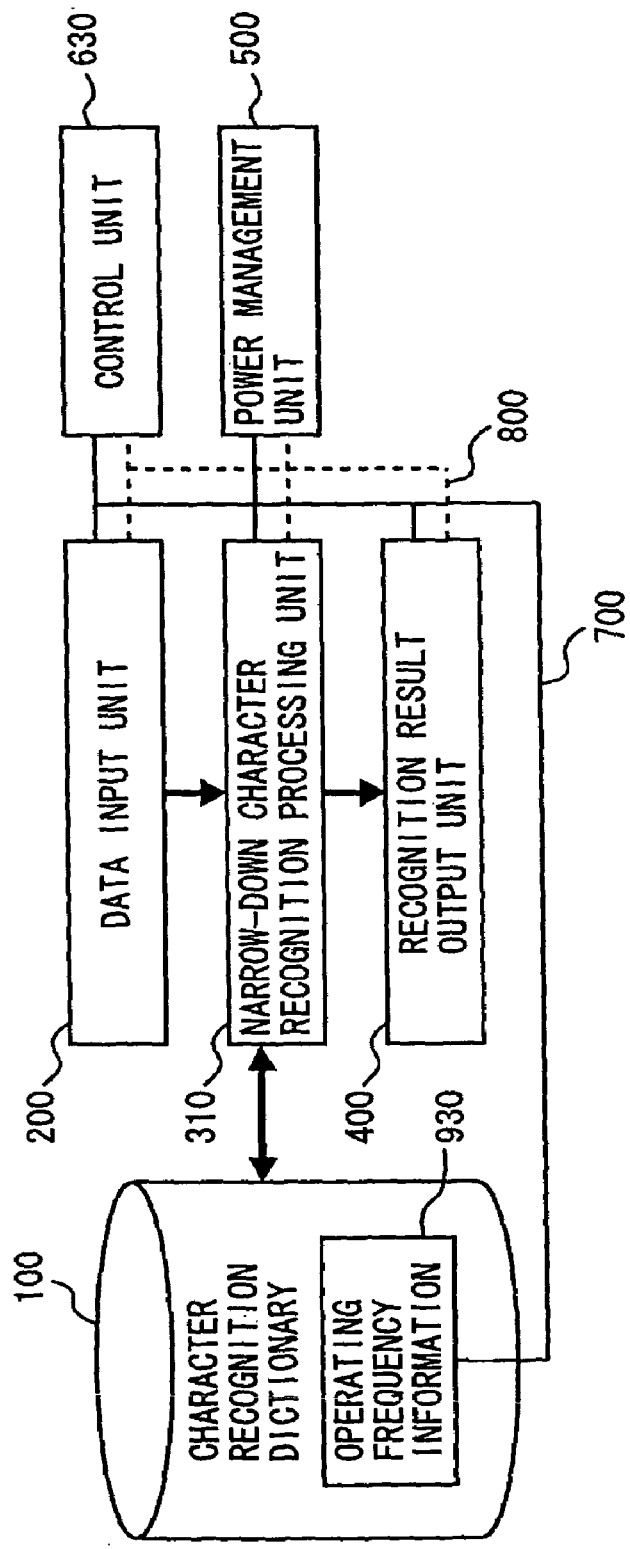
FIG. 9 is a control block diagram of a character recognition device according to a fourth embodiment of the present invention.

Referring to FIG. 9, a control block diagram of the character recognition device in this embodiment is described. It is noted that any component in the control block diagram shown in FIG. 9 that is the same as the corresponding one in FIG. 1 is denoted by the same reference character, has the same function, and thus detailed description thereof is not repeated here.

As shown in FIG. 9, the character recognition device in this embodiment includes a control unit 630 executing a program which is different from that of control unit 600 of the character recognition device in the above-discussed first embodiment, a narrow-down character recognition processing unit 310 carrying out processing different from that of character recognition processing unit 300, and a character recognition dictionary 100 storing operating frequency information 930 different from operating frequency information 900.

Figure 10:
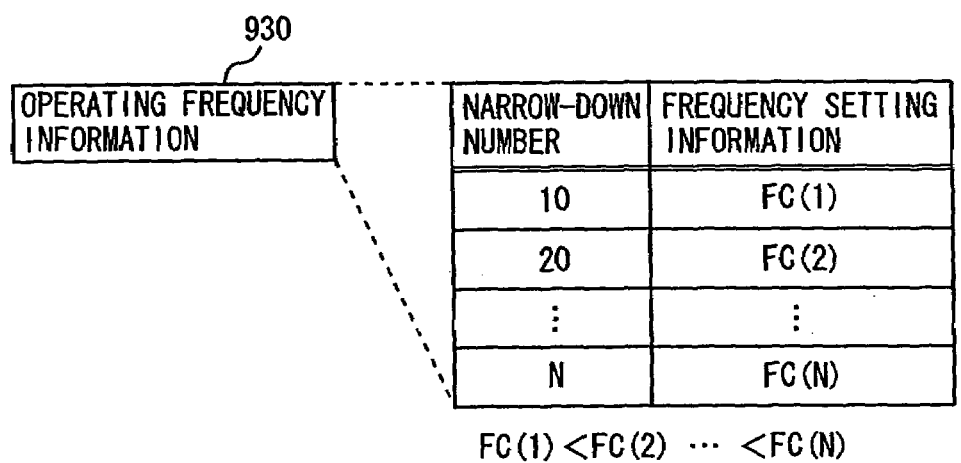
FIG. 10 shows operating frequency information in FIG. 9.

Operating frequency information 930 as shown in FIG. 10 includes frequency setting information stored correspondingly to the number of candidates that are narrowed down for a character to be recognized by narrow-down character recognition processing unit 310. (This number is hereinafter referred to as "narrow-down number"). For example, the frequency setting information is stored in such a way that, if the narrow-down number is "N", the operating frequency is "FC (N)". Here, a lower operating frequency is set for a smaller narrow-down number which is determined by narrow-down character recognition processing unit 310, as shown in FIG. 10.

Narrow-down character recognition processing unit 310 checks feature parameters of handwriting data supplied from data input unit 200 against character recognition dictionary 100 to narrow down, step-by-step, candidates for a character to be recognized thereby performing character recognition processing. In the process of stepwise narrow-down character recognition, the operating frequency is changed according to the narrow-down number of characters.

Figure 11:
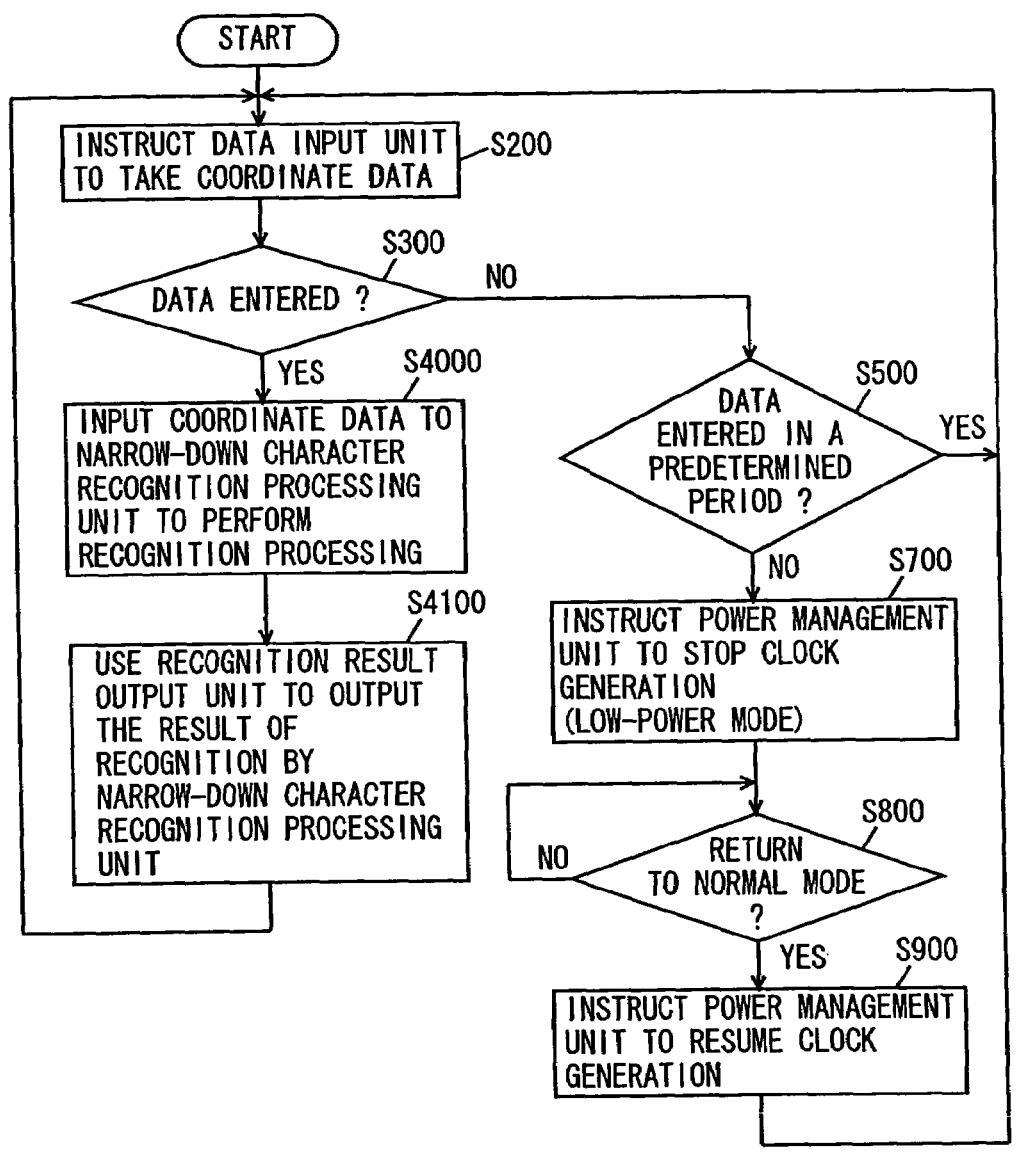
FIG. 11 is a flowchart showing a control structure of a program executed by a control unit in FIG. 9.

Referring to FIG. 11, a control structure of a program executed by control unit 630 of the character recognition device in this embodiment is described. It is noted that any process step in the flowchart shown in FIG. 11 that is the same as the corresponding one in FIG. 2 is indicated by the same step number, the processing therein is the same, and thus detailed description thereof is not repeated here.

In S4000, control unit 630 inputs coordinate data to narrow-down character recognition processing unit 310 to perform recognition processing. This recognition processing is detailed hereinlater. In S4100, control unit 630 uses recognition result output unit 400 to output the result of recognition by narrow-down character recognition processing unit 310.

Figure 12:
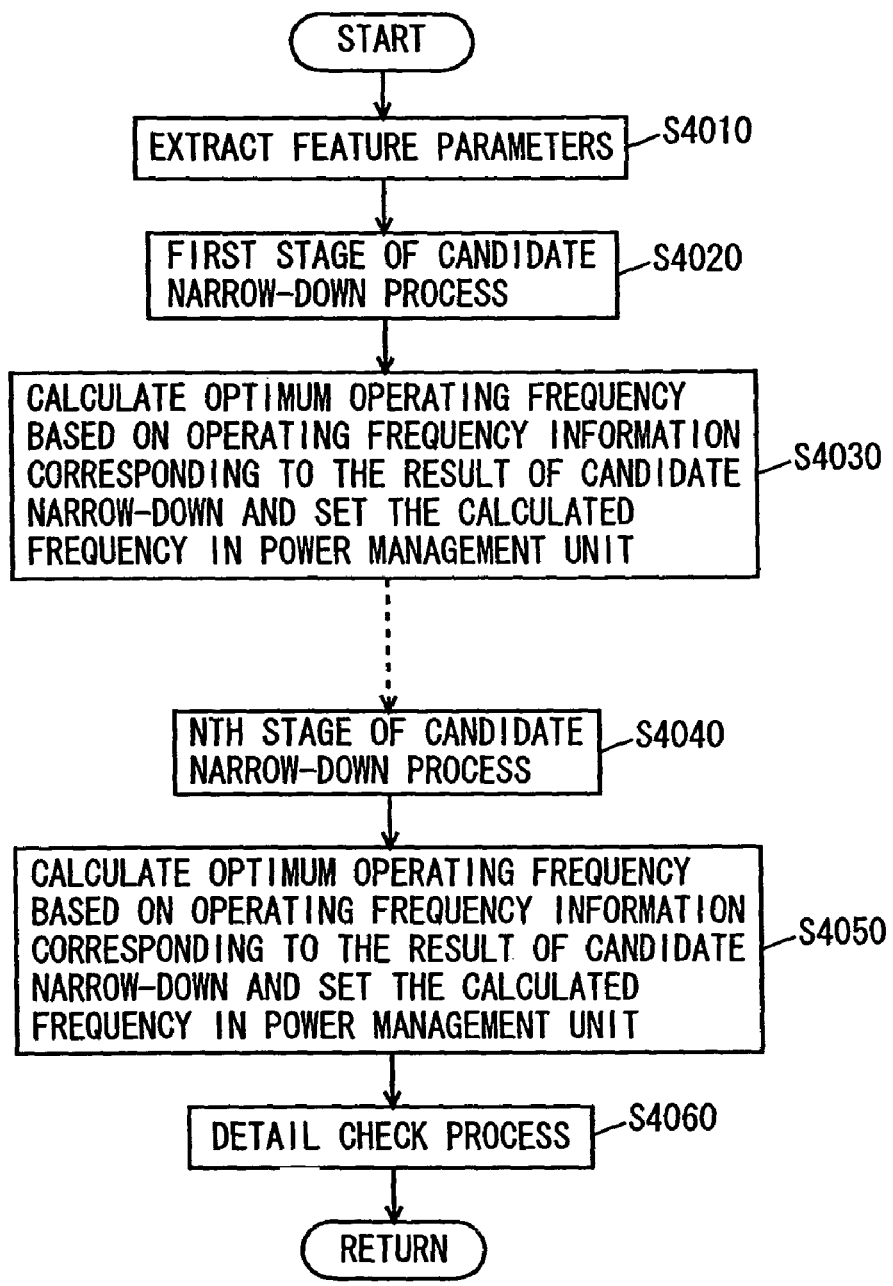
FIG. 12 is a flowchart showing a control structure of a program executed by a narrow-down character recognition processing unit in FIG. 9.

Referring to FIG. 12, a control structure of a program executed by narrow-down character recognition processing unit 310 of the character recognition device in this embodiment is described.

In S4010, narrow-down character recognition processing unit 310 extracts feature parameters. At this time, based on handwriting data entered from data input unit 200, the feature parameters are extracted. In S4020, narrow-down character recognition processing unit 310 carries out a first stage of a process of narrowing down candidates for a character. Here, the feature parameters extracted in S40 10 and information corresponding to the feature parameters that is stored in character recognition dictionary 100 are used.

In S4030, narrow-down character recognition processing unit 310 calculates an optimum operating frequency based on operating frequency information corresponding to the result of narrowing down candidates and then sets the calculated frequency in power management unit 500. At this time, as shown in FIG. 10, the operating frequency is set in power management unit 500 in such a way that, if the narrow-down number is "20", the operating frequency is "FC (2)".

The above-described process of narrowing down candidates is repeated step-by-step and, in S4040, narrow-down character recognition processing unit 310 carries out the Nth stage of the narrow-down process. In S4050, narrow-down character recognition processing unit 310 calculates an optimum operating frequency based on operating frequency information corresponding to the result of the narrow-down process and then sets the calculated frequency in power management unit 500.

In S4060, narrow-down character recognition processing unit 310 carries out a detail-check process. In S4060, by the detail-check process for the narrow-down candidate, the result of recognition is confirmed to end the character recognition processing. After the process in S4060, the character recognition process is returned to S4100 in FIG. 11.

An operation of the character recognition device in this embodiment based on the above-described structure and flowchart is described below.

A user enters handwriting data from data input unit 200 (YES in S300), and then coordinate data is input to narrow-down character recognition processing unit 310 to start recognition processing (S4000). Feature parameters are extracted (S4010), the first stage (S4020) of the candidate narrow-down process is performed and, power management unit 500 is controlled in such a way that an optimum operating frequency is set based on operating frequency information corresponding to the result of the candidate narrow-down process (S4030). This process is repeated and power management unit 500 is controlled to set a lower operating frequency each time the narrow-down number of candidates is decreased. Detail-check process is carried out (S4060) and the character recognition processing is completed.

As discussed above, the character recognition device in this embodiment adds, to the character recognition dictionary, operating frequency information corresponding to the narrow-down number of candidates for a character to be subjected to character recognition processing. Accordingly, the narrow-down character recognition processing unit can set an optimum operating frequency according to the number of candidates narrowed-down in the character recognition processing thereby avoiding processing at an unnecessarily high speed. Moreover, the operating frequency is set as low as possible and thus the power consumption can be reduced.

Fifth Embodiment

A character recognition device according to a fifth embodiment of the present invention is hereinafter described.

Figure 13:
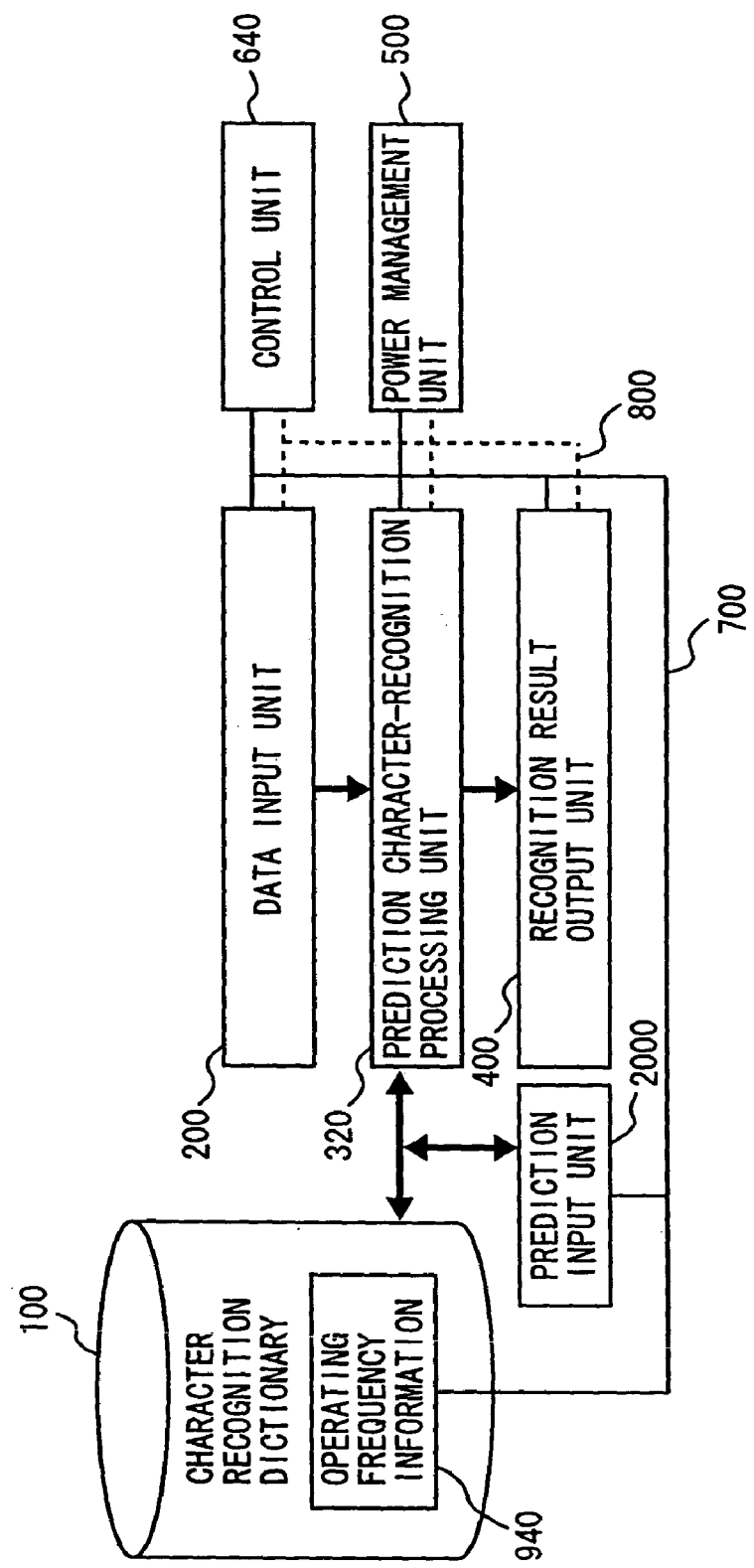
FIG. 13 is a control block diagram of a character recognition device according to a fifth embodiment of the present invention.

FIG. 13 shows a control block diagram of the character recognition device in this embodiment. It is noted that any component in the control block diagram shown in FIG. 13 that is the same as the corresponding one in FIG. 1 is denoted by the same reference character, has the same function, and thus detailed description thereof is not repeated here.

As shown in FIG. 13, the character recognition device in this embodiment includes a control unit 640 executing a program different from that of control unit 600 of the character recognition device in the above-discussed first embodiment, and a character recognition dictionary 100 storing operating frequency information 940 different from operating frequency information 900 in the first embodiment. The character recognition device in this embodiment further includes a prediction input unit 2000. Additionally, the character recognition device in this embodiment includes a prediction character-recognition processing unit 320 carrying out processing different from that of character recognition processing unit 300 of the above-described first embodiment.

Prediction input unit 2000 predicts, from the result of recognition by prediction character-recognition processing unit 320, characters which are subsequently input, Prediction character-recognition processing unit 320 can designate candidates for the character to be recognized in the character recognition process. In other words, the result of recognition by prediction character-recognition processing unit 320 is input to prediction input unit 200, and candidates for the character that may subsequently be entered can be obtained.

Figure 14:
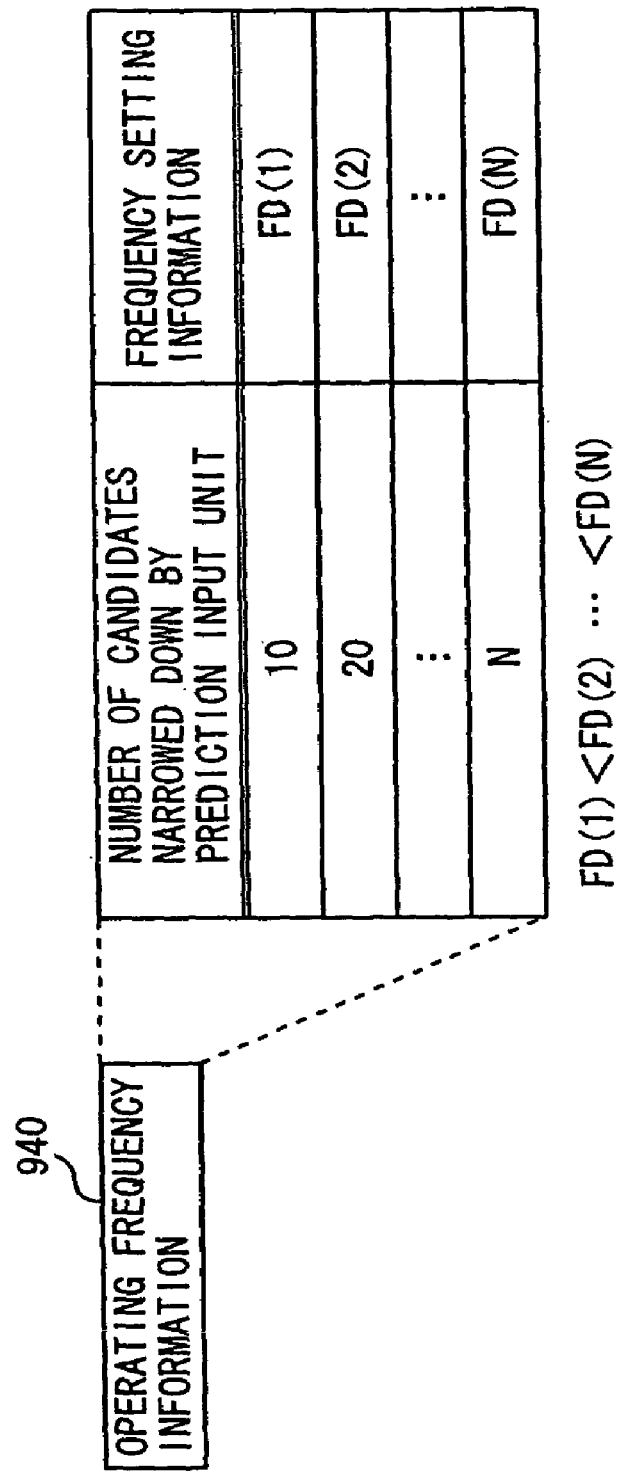
FIG. 14 shows operating frequency information shown in FIG. 13.

FIG. 14 shows operating frequency information 940. As shown in FIG. 14, operating frequency information 940 includes operating frequencies that are stored for respective numbers of candidates that are narrowed-down by prediction input unit 2000. For example, the frequency setting information is stored in such a way that, if the narrow-down number of candidates determined by prediction input unit 2000 is "20", the operating frequency is "FD (2)". Here, as shown in FIG. 14, a lower operating frequency is set for a smaller narrow-down number of candidates determined by prediction input unit 2000.

Figure 15:
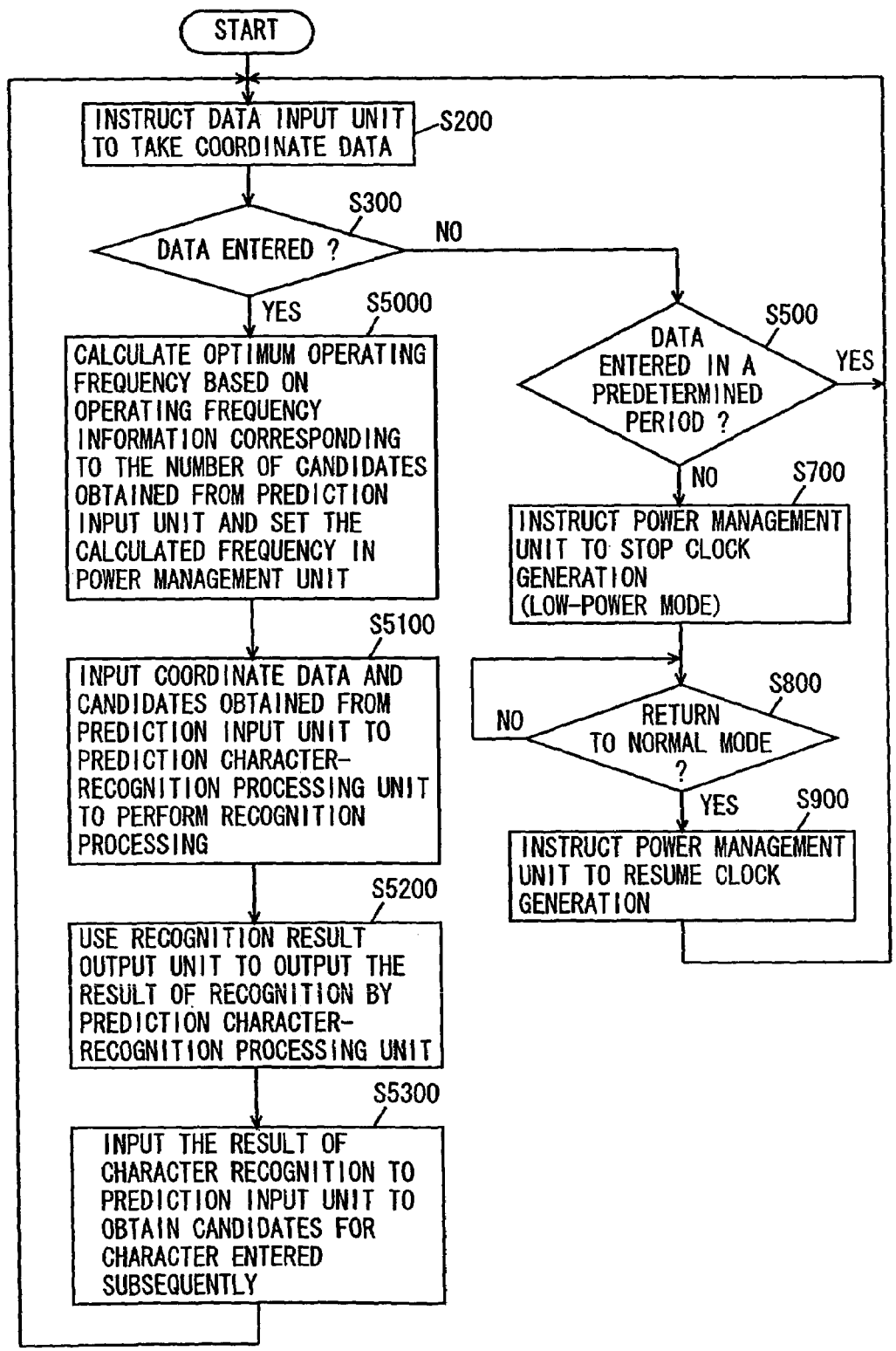
FIG. 15 is a flowchart showing a control structure of a program executed by a control unit in FIG. 13.

Referring to FIG. 15, a control structure of a program executed by control unit 640 of the character recognition device in this embodiment is described. It is noted that any process step in the flowchart shown in FIG. 15 that is the same as the corresponding one in FIG. 2 is indicated by the same step number, the processing therein is the same, and thus detailed description thereof is not repeated here.

In S5000, control unit 640 calculates an optimum operating frequency based on operating frequency information corresponding to the number of candidates that is supplied from prediction input unit 2000 and then sets the calculated frequency in power management unit 500. In S5100, control unit 640 inputs coordinate data obtained from data input unit 200 as well as candidates obtained from prediction input unit 2000 to prediction character-recognition processing unit 320, and recognition processing is performed.

In S5200, control unit 640 uses recognition result output unit 400 to output the result of recognition by prediction character-recognition processing unit 320. In S5300, control unit 640 inputs the result of character recognition to prediction input unit 200 to obtain candidates for a character to be entered subsequently.

An operation of the character recognition device in this embodiment based on the above-discussed structure and flowchart is described below. A user enters handwriting data from data input unit 200, an optimum frequency is then calculated based on operating frequency information corresponding the number of candidates obtained from prediction input unit 2000. The calculated operating frequency is set in power management unit 500 (S5000).

Coordinate data input to data input unit 200 as well as candidates obtained from prediction input unit 2000 are input to prediction character-recognition processing unit 320 and then character recognition processing is carried out (S5100). The result of the character recognition by prediction character-recognition processing unit 320 is input to prediction input unit 2000 and candidates for the character to be entered subsequently are obtained (S5300).

As discussed above, the character recognition device in this embodiment includes, in the character recognition dictionary, the operating frequency information corresponding to the number of candidates obtained from the prediction input unit. The control unit can set an optimum operating frequency according to the number of candidates determined by the prediction input unit. Accordingly, processing at an unnecessarily high speed can be avoided. Moreover, the operating frequency can be set as low as possible to reduce the power consumption.

Sixth Embodiment

A character recognition device according to a sixth embodiment of the present invention is hereinafter described.

Figure 16:
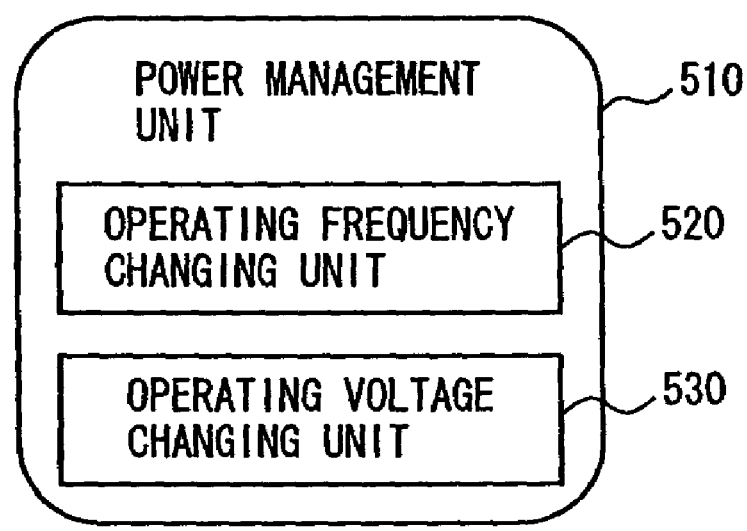
FIG. 16 is a control block diagram of a power management circuit of a character recognition device according to a sixth embodiment of the present invention.

As shown in FIG. 16, a power management unit 510 of the character recognition device in this embodiment has a structure different from that of power management unit 500 of the character recognition device in the above-discussed first embodiment.

Referring to FIG. 16, power management unit 510 of the character recognition device in this embodiment further includes an operating voltage changing unit 530 in addition to an operating frequency changing unit 520. In the first to fifth embodiments described above, power management unit 500 includes only the operating frequency changing unit 520 and no operating voltage changing unit 530. Power management unit 510 of the character recognition device in this embodiment having operating voltage changing unit 530 performs a voltage changing process by operating voltage changing unit 530 to lower the operating voltage when the operating frequency is low, in addition to the process of setting an optimum operating frequency.

As discussed above, the power management unit of the character recognition device in this embodiment changes the operating voltage and accordingly power consumption can be reduced.

Seventh Embodiment

A voice recognition device according to a seventh embodiment of the present invention is hereinafter described.

Figure 17:
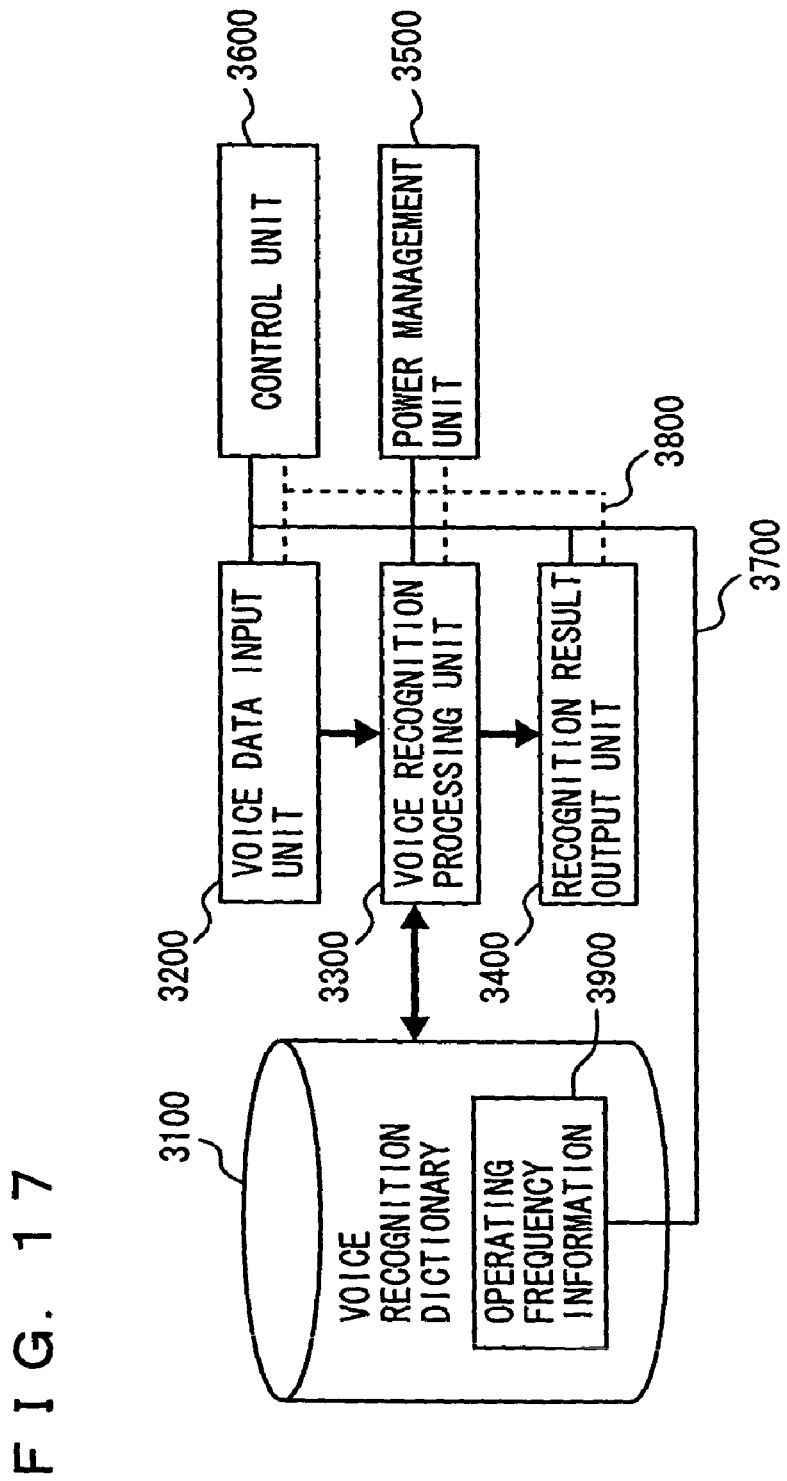
FIG. 17 is a control block diagram of a character recognition device according to a seventh embodiment of the present invention.

Referring to FIG. 17, the voice recognition device in this embodiment includes a voice recognition dictionary 3100 storing operating frequency information 3900 as well as information for voice recognition, a voice data input unit 3200 by which a user enters voice data, a voice recognition processing unit 3300 performing voice recognition processing based on the voice data entered from voice data input unit 3200 and the information stored in voice recognition dictionary 3100, a recognition result output unit 3400 which outputs the result of voice recognition by voice recognition processing unit 3300, a control unit 3600 controlling voice recognition dictionary 3100, voice data input unit 3200, voice recognition processing unit 3300, recognition result output unit 3400 and power management unit 3500 via a control line 3700, and a power management unit 3500 managing the operating frequency and operating mode of voice data input unit 3200, voice recognition processing unit 3300 and recognition result output unit 3400 via a control line 3800.

Operating frequency information 3900 stored in voice recognition dictionary 3100 includes an average clock number required for the recognition processing and an average process time corresponding to an operating frequency, for example, according to the number of words registered in voice recognition dictionary 3100.

Control unit 3600 uses operating frequency information 3900 to calculate an optimum operating frequency and set the calculated operating frequency in power management unit 3500. The optimum operating frequency here refers to a minimum operating frequency required for keeping an average time for voice recognition processing within a predefined time. The voice recognition process time depends on the number of words to be recognized that are registered in voice recognition dictionary 3100. Then, as the operating frequency information, a smaller clock number is stored for a voice recognition dictionary containing a smaller number of words to be recognized.

Figure 18:
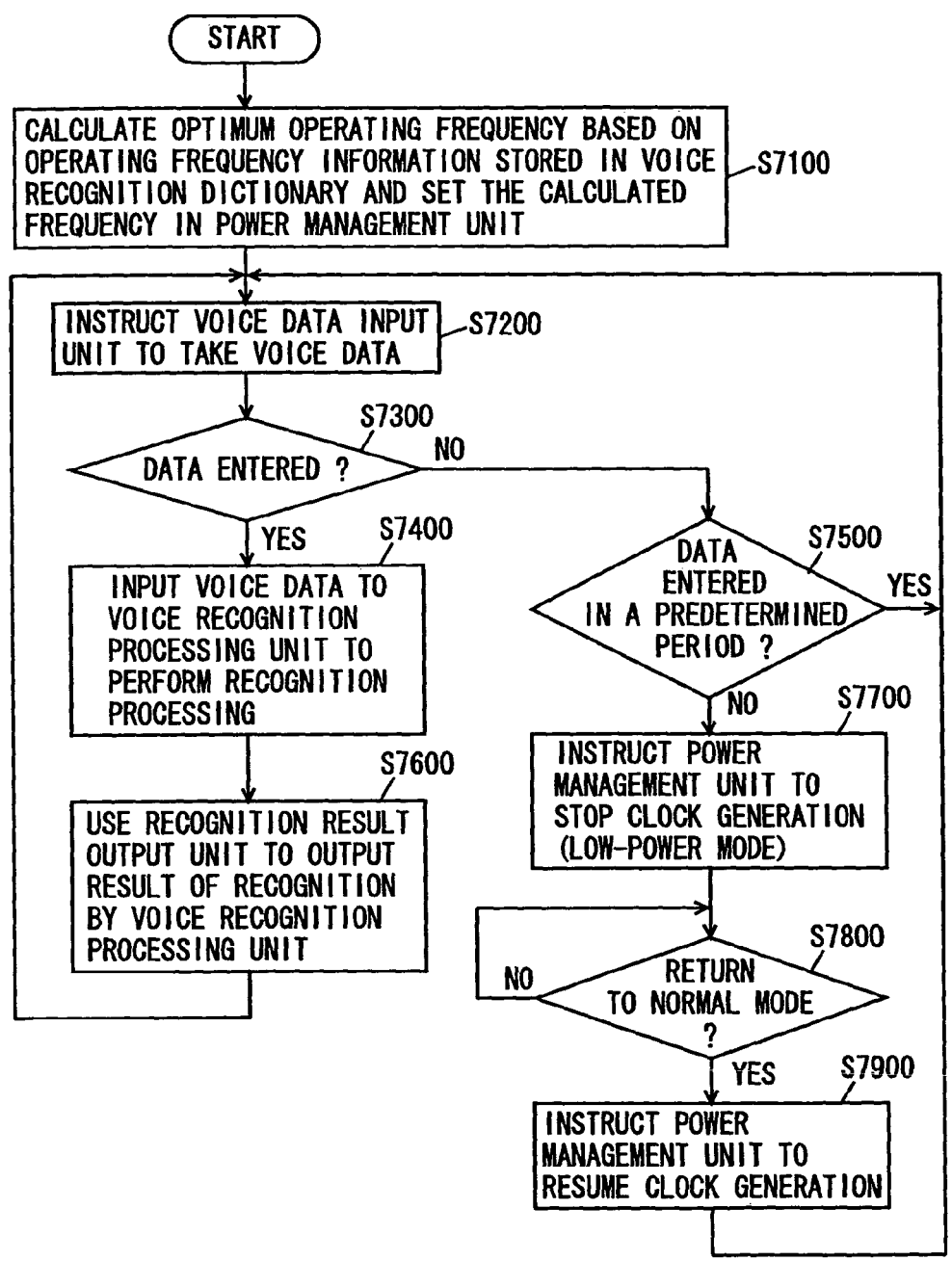
FIG. 18 is a flowchart showing a control structure of a program executed by a control unit in FIG. 17.

Referring to FIG. 18, a control structure of a program executed by control unit 3600 of the voice recognition device in this embodiment is described.

In S7100, control unit 3600 calculates an optimum operating frequency based on the operating frequency information stored in voice recognition dictionary 3100 and sets the calculated frequency in power management unit 3500. In S7200, control unit 3600 instructs voice data input unit 3200 to take voice data.

In S7300, control unit 3600 determines whether data is entered or not. If data is entered (YES in S7300), the process proceeds to S7400. If not (NO in S7300), the process proceeds to S7500.

In S7400, control unit 3600 inputs the voice data to voice recognition processing unit 3300 to perform recognition processing.

In S7500, control unit 3600 determines whether or not data is entered into voice data input unit 3200 in a predetermined period. If data is not entered into voice data input unit 3200 in the predetermined period (NO in S7500), the process proceeds to S7700. If data is entered (YES in S7500), the process is returned to S7200 and the voice recognition processing is repeatedly performed for voice data entered into voice data input unit 3200.

In S7600, control unit 3600 uses recognition result output unit 3400 to output the result of recognition by voice recognition processing unit 3300. The process is thereafter returned to S7200.

In S7700, control unit 3600 instructs power management unit 3500 to stop clock generation, namely to shift the operating mode of this voice recognition device to a low-power mode.

In S7800, control unit 3600 determines whether or not the operating mode should be returned to a normal mode. If the mode should be returned to the normal mode (YES in S7800), the process proceeds to S7900. If not (NO in S7800), the process is returned to S7800 to wait for the timing of returning to the normal mode.

In S7900, control unit 3600 instructs power management unit 3500 to resume clock generation. After this, the process is returned to S7200.

An operation of the voice recognition device in this embodiment based on the above-discussed structure and flowchart is described below.

Based on the operating frequency information stored in voice recognition dictionary 3100, an optimum operating frequency is calculated. The calculated operating frequency is set in power management unit 3500 (S7100). Accordingly, voice data input unit 3200, voice recognition processing unit 3300 and recognition result output unit 3400 that are managed by power management unit 3500 are controlled to operate at the operating frequency set in power management unit 3500.

A user enters voice data by means of voice data input unit 3200 (YES in S7300), the voice data is input to voice input processing unit 3300 and the recognition processing is performed (S7400). The result of recognition by voice recognition processing unit 3300 is output by means of recognition result output unit 3400.

In such an operation as described above, if no voice data is entered by a user from voice data input unit 3200 in a predetermined period (NO in S7500), power management unit 3500 stops clock generation and shifts the operating mode of the voice recognition device to the low-power mode (S7700). When it is determined that the operating mode should be returned to the normal mode upon pushing of a specific button by the user while the device operates in the low-power mode (YES in S7800), power management unit 3500 resumes clock generation.

As discussed above, the voice recognition dictionary of the voice recognition device in this embodiment includes the operating frequency information. When the voice recognition dictionary contains a small number of words to be recognized, the control unit sets a lower operating frequency in the power management unit. Power consumption can accordingly be reduced.

In the voice recognition device in this embodiment, as the character recognition device in the above-discussed first embodiment, voice recognition dictionary 3100 may be in the form of a memory card which is detachably held in the voice recognition device. At this time, memory cards may have respective different languages to be recognized in the voice recognition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recognition device performing recognition processing on characters comprising:

an input unit for entering handwriting data representing a character to be subjected to said recognition processing;

a storage unit storing first information required for recognition of the character by a character recognition module and second information concerning power consumption of said information recognition device that is set in connection with the recognition processing;

the character recognition module recognizing the character based on said handwriting data and said first information;

an output unit outputting the character recognized by said character recognition module;

a power management unit managing power consumption of said information recognition device; and a control module controlling said power management unit based on said second information, wherein said storage unit is a dictionary memory provided for each language of characters to be recognized, and said information recognition device further comprises a holding unit detachably holding said dictionary memory for replacing said dictionary memory to change the language to be recognized, said dictionary memory stores, as said second information, information concerning an operating frequency of said information recognition device that is set for each language of characters to be recognized, and said control module calculates an optimum operating frequency based on said second information and controls said power management unit in such a way that the operating frequency of said information recognition device is to said calculated operating frequency.

2. The information recognition device according to claim 1, further comprising a limitation module limiting the type of characters to be recognized, wherein said storage unit stores, as said second information, information concerning an operating frequency of said information recognition device that is set according to said limited type of characters to be recognized, and said control module calculates an optimum operating frequency based on said limited type of characters and said second information and controls said power management unit in such a way that the operating frequency of said information recognition device is changed to said calculated operating frequency.

3. The information recognition device according to claim 1, further comprising a calculation module calculating the number of strokes of a character to be recognized based on said handwriting data, wherein said storage unit stores, as said second information, information concerning an operating frequency of said information recognition device that is set according to said number of strokes of the character to be recognized, and said control module calculates an optimum operating frequency based on said calculated number of strokes of the character to be recognized and said second information and controls said power management unit in such a way that the operating frequency of said information recognition device is changed to said calculated operating frequency.

4. The information recognition device according to claim 1, wherein said character recognition module narrows down candidates for a character to be recognized step-by-step to recognize the character, said storage unit stores, as said second information, information concerning an operating frequency of said information recognition device that is set according to the number of said candidates for the character to be recognized, and said control module calculates an optimum operating frequency based on said number of candidates for the character to be recognized and said second information and controls said power management unit in such a way that the operating frequency of said information recognition device is changed to said calculated operating frequency.

5. The information recognition device according to claim 1, further comprising a prediction module predicting candidates for a subsequently entered character based on a recognition history, wherein said storage unit stores, as said second information, information concerning an operating frequency of said information recognition device that is set according to the number of said candidates for the character, and said control module calculates an optimum operating frequency based on the number of said predicted candidates for the character to be recognized and said second information and controls said power management unit in such a way that the operating frequency of said information recognition device is changed to said calculated operating frequency.

6. The information recognition device according to claim 1, wherein said power management unit manages power consumption of said information recognition device by changing an operating voltage of said information recognition device based on an instruction in accordance with said second information supplied from said control module.

* * * * *